United States Patent Office 3,148,131
Patented Sept. 8, 1964

3,148,131
PROCESS FOR THE PURIFICATION OF SILICON
Jacques Coursier, Grenoble, Isere, and Michel Moutach, Gieres, Isere, France, assignors to Pechiney Compagnie de Produits Chimiques et Electrometallurgiques, Paris, France
No Drawing. Filed Mar. 29, 1961, Ser. No. 99,055
Claims priority, application France Apr. 1, 1960
14 Claims. (Cl. 204—130)

This invention relates to the removal of impurities from silicon and to a method for the separation of silicon of high purity.

Various methods have been developed for the purification of silicon by the removal of impurities, including for example the fractional crystallization of silicon in an aluminum alloy; melting of the impure silicon in the presence of copper; removing some of the impurities by solution in aqueous acid liquid, such as hydrochloric acid, hydrofluoric acid and/or nitric acid. These processes have, however, been found to be incapable of use completely to remove all of the impurities present in the silicon which include, amongst others, boron, iron, aluminum, copper, titanium, calcium, etc.

Exceptionally pure silicon can be prepared by the reduction and/or thermal decomposition of an exceptionally pure vaporizable compound of silicon, such as trichlorosilane. This process, however, embodies a difficult and costly procedure for the preparation of the vaporizable compound in the desired state of purification and its corresponding reduction to produce the silicon in a form sufficiently purified for use in the manufacture of very sensitive equipment, such as in the manufacture of transistors.

It is an object of this invention to produce and to provide a simple and economical method for producing silicon having a high degree of purity and more particularly silicon which is at least 99.95 percent pure and even 99.99±0.005 percent pure, and it is a related object to provide a method for the removal of impurities from an impure silicon.

Another object is to produce and to provide a method for producing a purified silicon having an electrical resistivity higher than several ohms/centimeter and even better than several tens of ohms, and preferably between 5 and 40 ohms/centimeter, such as can be used in the manufacture of light cells.

In accordance with the practice of this invention the impure silicon, in the presence of a fluoride of at least one of the metals including silver, caesium, lead, thallium, copper, cadmium, gallium, titanium and zinc, is heated to a temperature above the fusion temperature of the metal fluoride and preferably to a temperature within the range of 1000–1600° C. This includes a temperature range above the fusion temperature of silicon between 1450–1600° C. or below the fusion temperature of silicon, such as within the range of 1000–1400° C. In the practice of this invention, it is desirable to make use of an amount of metal fluoride wherein the ratio of metal fluoride to the impure silicon is greater than 5 and less than 9 and preferably within the range of six to seven.

It is preferred, though not essential, to carry out the described treatment under subatmospheric conditions and/or under an inert or reducing atmosphere, such as in the presence of argon, hydrogen and the like.

In accordance with a further important concept of this invention, it has been found that the treatment described is benefited by the further presence of one or more of the metals previously listed as suitable for use as a metallic component in the fluoride compound. In the preferred practice, use is made of a metal which corresponds to the metallic component of the fluoride which is being used. When the combination of metal and metal fluoride is employed in the elevated temperature treatment of the impure silicon for the removal of impurities, it is desirable to make use of a ratio of metal fluoride to metal in the range of 0.05 to 0.3 and preferably in the order of about 0.2.

In the practice of this invention wherein use is made of both the metal fluoride and the metal, as represented by the use of silver fluoride and silver, in the treatment of powdered impure silicon for the removal of impurities, treatment is carried out at a temperature above 430° C. and preferably at a temperature within the range of 1000–1600° C. and more particularly at a temperature of about 1300° C. The silver fluoride, preferably present in a finely divided state, is employed in amounts less than the impure silicon and preferably with the silver fluoride and impure silicon being present within the ratio of 0.4 to 0.9 while the metallic silver, preferably also present in finely divided form, is employed in an amount greater than the impure silicon and preferably three to six times greater than the impure silicon. It will be understood that others of the metals and metal fluorides indicated in the previous paragraph may be employed in the reaction in corresponding amounts.

Instead of supplying the metal fluoride as a component in the treatment of impure silicon, use can be made of one or more of the metal fluorides formed in situ during treatment by reaction of the metallic component in metallic form with gaseous hydrofluoric acid. When gaseous hydrofluoric acid is employed for conversion of at least a part of the metallic component to the corresponding metal fluoride for concurrent treatment of the impure silicon, it is desirable to supply the hydrofluoric acid under 5 to 300 mm. of mercury pressure, with or without dilution by a neutral or reducing gas, such as argon and/or hydrogen.

Treatment of impure silicon in accordance with the concepts described will result in a billet of pure silicon and a metallic alloy formed of the metal or metals used in the course of the treatment and which also contains various of the metallic impurities originally present in the impure silicon. The purified silicon is separated from the alloy by conventional means, such as by electrolyzing the alloy in accordance with the techniques of electrolytic refining wherein the billet is arranged as the anode. The pure silicon that remains can be washed repeatedly, as by aqua regia or the like for additional purification.

The following examples are given by way of illustration, but not by way of limitation, of the practice of the invention:

*Example 1*

100 grams of impure silicon, in finely divided form, and 90 grams of silver fluoride are thoroughly mixed together and then 400 grams of finely divided pure silver are added. The mixture is heated progressively to a temperature of about 1300° C. during 2 hours in an inert atmosphere of argon and then it is cooled to produce a small billet formed of a mixture of purified silicon and a silver base alloy containing impurities originally present in the impure silicon. The billet is electrolytically refined to remove the alloy. The remaining silicon is washed successively one or more times with aqueous solutions of a nitric acid, hydrofluoric acid, aqua regia, and then water more completely to remove the alloy or traces thereof.

The following is an analysis of the impure silicon treated and the purified silicon resulting from treatment in accordance with Example 1: The portions identified as indeterminable indicate amounts so small as to be incapable of determination.

| Product | Impurities (parts per million) | | | | | | |
|---|---|---|---|---|---|---|---|
| | Ag | Fe | Al | Ti | Cu | Ca | B |
| Si (initial) | 0 | 50 | 50 | 10 | 25 | 300 | 8 |
| Si (obtained) | (1) | <2 | <25 | <5 | <10 | (1) | (1) |

1 Not determinable.

Example 2

50 grams of impure silicon having an electrical resistivity of between 0.04 and 0.06 ohm/centimeter are treated with 350 grams of silver fluoride at a temperature of about 1500° C. during 2 hours in the presence of hydrogen, the silver fluoride being added progressively in separate increments into the molten mass. Following thermal treatment of the mixture, the product is cooled and the resulting billet is processed, as in Example 1, to remove the resulting silver base alloy. The purified silicon which is obtained has an electrical resistivity of between 20 and 40 ohms/centimeter.

Example 3

50 grams of impure silicon having an electrical resistivity of about 0.04 ohm/centimeter are mixed with 300 grams pure aluminum and heated to a temperature to reduce the materials to a molten state. A mixture of hydrogen and hydrogen fluoride in the ratio of about 20 volumes of hydrogen to one volume of hydrogen fluoride is continuously bubbled through the molten mass in amounts for conversion of about 10 percent or more of the aluminum to aluminum fluoride in the treatment of the impure silicon.

After a 3 hour heat treatment and subsequent cooling down, the resulting billet is processed, as described in Example 1, to separate the resulting aluminum base alloy from the purified silicon to produce a silicon having an electrical resistivity greater than 10 ohms/centimeter.

Example 4

100 grams of impure silicon having an electrical resistivity of about 0.03 ohm/centimeter are blended with 400 grams of pure silver and 22 grams of pure aluminum fluoride, all in finely divided form. The mixture is heated 2 hours under vacuum at a temperature of about 1350° C.

The heated mass is cooled and the silver alloy is separated from the purified silicon by the technique described in Example 1 to produce a purified silicon having an electrical resistivity of at least 5 ohms/centimeter.

Others of the metals and fluorides of metals such as caesium, lead, thallium, copper, cadmium, gallium, titanium and zinc can be substituted in corresponding amounts for the aluminum in Example 3 or for the silver and silver fluorides in Examples 1, 2 and 4 in the treatment of impure silicon under the conditions described to remove impurities and produce a purified silicon.

It will be understood that changes may be made in the details of formulation and conditions without departing from the spirit of the invention, especially as defined in the following claims.

We claim:

1. In a process for the production of a purified silicon from an impure silicon, the steps of treating the impure silicon with the fluoride of at least one of the metals selected from the group consisting of silver, caesium, lead, thallium, aluminum, copper, cadmium, gallium, titanium and zinc at a temperature above the melting point temperature for the metal fluoride, and separating the materials formed during the treating step from the purified silicon.

2. In a process for the production of a purified silicon from an impure silicon, the steps of treating the impure silicon with the fluoride of at least one of the metals selected from the group consisting of silver, caesium, lead, thallium, aluminum, copper, cadmium, gallium, titanium and zinc at a temperature within the range of 1000–1600° C. and in an amount to provide a ratio of metal fluoride to impure silicon of between 5 and 9, and separating the materials formed during the treating step from the purified silicon.

3. In a process for the production of a purified silicon from an impure silicon, the steps of treating the impure silicon with the fluoride of at least one of the metals selected from the group consisting of silver, caesium, lead, thallium, aluminum, copper, cadmium, gallium, titanium and zinc at a temperature below the fusion temperature of silicon within the range of 1000–1600° C. and electrolytically separating the materials formed during the treating step from the purified silicon.

4. In a process for the production of a purified silicon from an impure silicon, the steps of treating the impure silicon with the fluoride of at least one of the metals selected from the group consisting of silver, caesium, lead, thallium, aluminum, copper, cadmium, gallium, titanium and zinc at a temperature above the melting point temperature for the metal fluoride and in an amount to provide a ratio of metal fluoride to impure silicon of between 5 and 9 to produce a silicon having a purity of at least 99.95 percent silicon and an electrical resistivity of at least several ohms/centimeter and electrolytically separating the materials formed during the treating step from the purified silicon.

5. A process as claimed in claim 4 in which the treatment is carried out under subatmospheric conditions.

6. A process as claimed in claim 4 which includes the step of forming the metal fluoride in situ by reaction of the metal with hydrogen fluoride.

7. A process as claimed in claim 5 in which the treatment is carried out in an inert atmosphere.

8. A process as claimed in claim 5 in which the treatment is carried out in a reducing atmosphere.

9. In a process for the production of a purified silicon from an impure silicon, the steps of treating the impure silicon with the fluoride of at least one of the metals selected from the group consisting of silver, caesium, lead, thallium, aluminum, copper, cadmium, gallium, titanium and zinc and a metal selected from the group consisting of silver, caesium, lead, thallium, aluminum, copper, cadmium, gallium, titanium and zinc, at a temperature above the melting point temperature for the metal fluoride, and separating the materials formed during the treating step from the purified silicon.

10. In a process for the production of a purified silicon from an impure silicon, the steps of treating the impure silicon with the fluoride of at least one of the metals selected from the group consisting of silver, caesium, lead, thallium, aluminum, copper, cadmium, gallium, titanium and zinc and a metal selected from the group consisting of silver, caesium, lead, thallium, aluminum, copper, cadmium, gallium, titanium and zinc, at a temperature above the melting point temperature of the metal fluoride and in which the ratio of metal fluoride to metal is within the range of 0.05 to 0.3, and electrolytically separating the materials formed during the treating step from the purified silicon.

11. A process as claimed in claim 10 in which the treating temperature is within the range of 1000–1600° C.

12. A process as claimed in claim 10 in which both the metal and the metal fluoride are originally introduced as a metal and the metal fluoride is produced in situ by the step of introducing gaseous hydrogen fluoride during the heat treatment.

13. In a process for the production of a purified silicon from an impure silicon, the steps of treating the impure silicon with the fluoride of at least one of the metals selected from the group consisting of silver, caesium, lead, thallium, aluminum, copper, cadmium, gallium, titanium and zinc and a metal selected from the group consisting of silver, caesium, lead, thallium, aluminum, copper, cadmium, gallium, titanium and zinc, at a temperature above the melting point temperature for the metal fluoride and in which the ratio of metal fluoride to metal is within the range of 0.05 to 0.3.

14. In a process for the production of a purified silicon from an impure silicon, the steps of treating the impure silicon with the fluoride of at least one of the metals selected from the group consisting of silver, caesium, lead, thallium, aluminum, copper, cadmium, gallium, titanium and zinc and a metal selected from the group consisting of silver, caesium, lead, thallium, aluminum, copper, cadmium, gallium, titanium and zinc, at a temperature above the melting point temperature for the metal fluoride, and electrolytically separating the materials formed during the treating step from the purified silicon.

References Cited in the file of this patent

UNITED STATES PATENTS

| | | | |
|---|---|---|---|
| 1,386,227 | Becket | | Aug. 2, 1921 |
| 2,885,364 | Swartz | | May 5, 1959 |
| 2,937,929 | Voos | | May 24, 1960 |
| 2,955,024 | Smith | | Oct. 4, 1960 |
| 2,972,521 | Voos | | Feb. 21, 1961 |
| 2,992,080 | Herrick | | July 11, 1961 |
| 2,999,736 | Shalit | | Sept. 12, 1961 |
| 3,008,887 | Herglotz | | Nov. 14, 1961 |
| 3,010,797 | Aries | | Nov. 28, 1961 |

FOREIGN PATENTS

| | | |
|---|---|---|
| 461,444 | Canada | Nov. 29, 1949 |
| 8,158 | Japan | 1954 |
| 1,754 | Japan | 1958 |

OTHER REFERENCES

Jacobson's "Encyclopedia of Chemical Reactions," vol. 3, 1949 ed., page 279, Reinhold Publ. Corp., New York.